US012499328B2

(12) United States Patent
Sudo (10) Patent No.: US 12,499,328 B2
(45) Date of Patent: Dec. 16, 2025

(54) TONAL LANGUAGE DICTIONARY SEARCH DEVICE, TONAL LANGUAGE DICTIONARY SEARCH METHOD, AND NON-TRANSITORY COMPUTER-READABLE STORAGE MEDIUM STORING A COMPUTER PROGRAM READABLE BY A COMPUTER OF A TONAL LANGUAGE DICTIONARY SEARCH DEVICE

(71) Applicant: CASIO COMPUTER CO., LTD., Tokyo (JP)

(72) Inventor: Risa Sudo, Hamura (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 257 days.

(21) Appl. No.: 18/218,627

(22) Filed: Jul. 6, 2023

(65) Prior Publication Data
US 2024/0037129 A1    Feb. 1, 2024

(30) Foreign Application Priority Data

Jul. 27, 2022    (JP) .................................. 2022-119881

(51) Int. Cl.
*G06F 40/53*     (2020.01)
*G06F 16/3332*   (2025.01)
(Continued)

(52) U.S. Cl.
CPC .......... *G06F 40/53* (2020.01); *G06F 16/3337* (2019.01); *G06F 40/242* (2020.01); *G06V 30/19* (2022.01); *G06V 30/287* (2022.01)

(58) Field of Classification Search
None
See application file for complete search history.

(56) References Cited

U.S. PATENT DOCUMENTS 5,832,478 A * 11/1998 George ................. G06F 16/951
382/229
8,271,265 B2 * 9/2012 Kim ...................... G06F 40/129
704/4
(Continued)

FOREIGN PATENT DOCUMENTS

JP    H10269238 A    10/1998
JP    H10269239 A    10/1998
(Continued)

*Primary Examiner* — Douglas Godbold
(74) *Attorney, Agent, or Firm* — Holtz, Holtz & Volek PC (57) ABSTRACT

According to one embodiment, a CPU generates, based on a tone-marked pinyin search character string containing a wildcard "?" and acquired from a communication terminal, a tone-number-added pinyin search character string for wildcard search in which "0" is added to a character having no tone number (i.e., an alphabetical letter representing a consonant) and a tone number wildcard "?" is added to a position immediately after the existing wildcard "?". The CPU also generates a tone-number-added pinyin entry word character string for wildcard search, by adding "0" to a character having no tone number in a tone-number-added pinyin entry word character string corresponding to a Chinese-Japanese dictionary entry word that matches a tone-number-omitted pinyin search character string. The CPU then compares the tone-number-added pinyin search character string for wildcard search with the tone-number-added pinyin entry word character string for wildcard search to determine if they match each other.

10 Claims, 6 Drawing Sheets

(51) Int. Cl.
    *G06F 40/242*     (2020.01)
    *G06V 30/19*     (2022.01)
    *G06V 30/28*     (2022.01)

(56) References Cited

U.S. PATENT DOCUMENTS

| | | | | |
|---|---|---|---|---|
| 2005/0114138 | A1* | 5/2005 | Tomishige | G06F 3/018 704/260 |
| 2008/0052064 | A1* | 2/2008 | Kim | G06F 40/129 707/E17.103 |
| 2008/0186211 | A1* | 8/2008 | Harman | G06F 3/018 341/22 |
| 2010/0125449 | A1* | 5/2010 | Hsu | G06F 3/018 704/8 |
| 2014/0081621 | A1* | 3/2014 | Ogawa | G06F 40/242 704/8 |
| 2014/0081622 | A1* | 3/2014 | Ogawa | G06F 40/242 704/8 |
| 2015/0205781 | A1* | 7/2015 | Feng | G06F 40/279 704/9 |
| 2016/0019201 | A1* | 1/2016 | Qian | G06F 3/04883 704/9 |
| 2021/0050001 | A1* | 2/2021 | Chen | G06N 3/044 |

FOREIGN PATENT DOCUMENTS

| | | |
|---|---|---|
| JP | H11250063 A | 9/1999 |
| JP | 2005157751 A | 6/2005 |

* cited by examiner

| Entry word data number | Tone-number-omitted pinyin |
|---|---|
| ⋮ | ⋮ |
| ⋯11 | baicai |
| ⋮ | ⋮ |
| ⋯45 | bancai |
| ⋮ | ⋮ |
| ⋯64 | zuoan |
| ⋯65 | zuoba |
| ⋯66 | zuoban |
| ⋮ | ⋮ |

| Entry word data number | Tone-number-added pinyin |
|---|---|
| ⋮ | ⋮ |
| ⋯11 | bai2cai4 |
| ⋮ | ⋮ |
| ⋯45 | ban3cai2 |
| ⋮ | ⋮ |
| ⋯64 | zuo4an4 |
| ⋯65 | zuo4ba4 |
| ⋯66 | zuo4ban3 |
| ⋮ | ⋮ |

TONAL LANGUAGE DICTIONARY SEARCH DEVICE, TONAL LANGUAGE DICTIONARY SEARCH METHOD, AND NON-TRANSITORY COMPUTER-READABLE STORAGE MEDIUM STORING A COMPUTER PROGRAM READABLE BY A COMPUTER OF A TONAL LANGUAGE DICTIONARY SEARCH DEVICE

CROSS-REFERENCE TO RELATED APPLICATION(S)

This application is based upon and claims the benefit of priority from the prior Japanese Patent Application No. 2022-119881, filed Jul. 27, 2022, the entire contents of which are incorporated herein by reference.

FIELD

Embodiments disclosed herein relate generally to a search device, a search method, and a recording medium for searching of a tonal language.

BACKGROUND

As a process of searching for a word in a tonal language, for example, Chinese, conventional electronic dictionaries and the like use a kanji search process, a pinyin search process, etc. The kanji search process retrieves a word containing a kanji character input by handwriting or input based on a stroke count of a radical part or a whole character. The pinyin search process retrieves a word corresponding to a phonetic representation converted from a Chinese word, so-called "pinyin", a tone-marked alphabetical character string.

Pinyin, typically, is constituted by alphabetical letters representing a vowel and a consonant and a tone mark representing an intonation. In a general pinyin search process, a search for a desired word is enabled by combining alphabetical letters of the pinyin rendering of a desired Chinese word with tone numbers (1 to 4) corresponding to the tone marks.

In instances where a wildcard search is performed for a word by replacing a portion of its phonetic representation including a tone mark with a character, e.g., "?", indicating an unknown content, it is often the case that not only an alphabetical letter corresponding to such a portion of the phonetic representation is unknown but also the tone mark that should be added to the alphabetical letter is unknown. In this regard, for example, Jpn. Pat. Appln. KOKAI Publication No. H10-269239 discloses a Chinese pinyin search method. According to this method, a tone number "0" is added to a vowel of a neutral tone having no tone mark. If the tone mark is unknown, an index word is input with a symbol "-", and tone numbers corresponding to respective tone marks are then sequentially input in the order of 0, 1, 2, . . . in substitution for "-" so as to search for words based on comparison with the index word.

SUMMARY

According to an embodiment, a search device includes one or more processors which:
acquire, as a first search target character string, a character string constituted by a plurality of characters and a tone indication, the plurality of characters including an unknown character;
acquire, as a conversion candidate, a character string which matches the first search target character string without the tone indication;
generate a conversion candidate character string of a predetermined number of characters by adding a tone indication to the conversion candidate;
generate a second search target character string by at least adding a character indicative of an unknown tone indication to a position immediately after the unknown character among the plurality of characters in the first search target character string;
compare the second search target character string with the conversion candidate character string; and
output a comparison result of comparing the second search target character string with the conversion candidate character string.

DETAILED DESCRIPTION

Embodiments in this disclosure will be described with reference to the drawings.
(Configurations for Embodiments)

Figure 1:
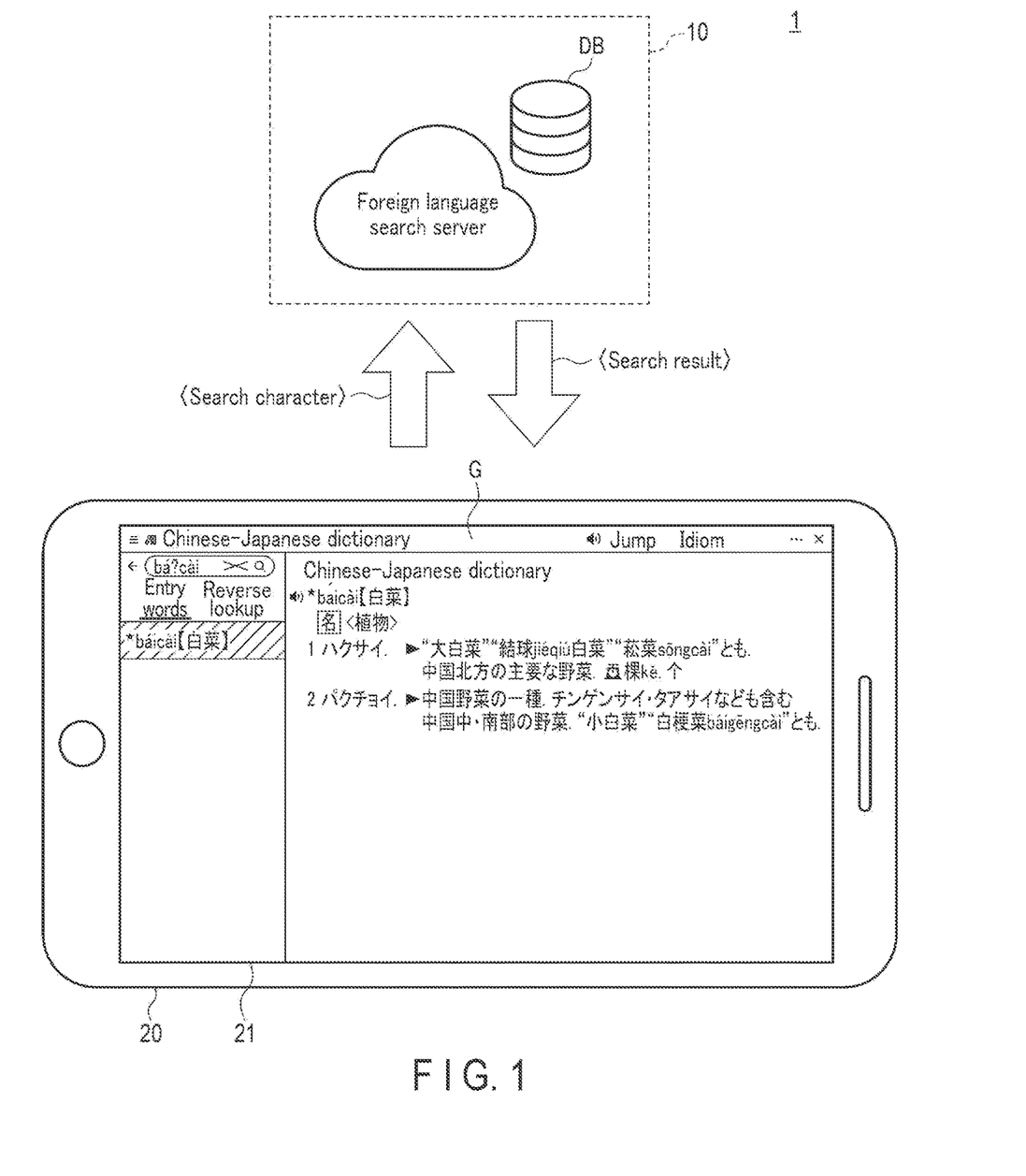
FIG. 1 is a diagram showing an example of a general configuration of a search system 1 for exemplary embodiments of a search device, a search method, and a program according to the disclosure herein.

FIG. 1 is a diagram showing an example of a general configuration of a search system 1 for exemplary embodiments of a search device, a search method, and a program according to the disclosure herein.

The search system 1 includes a foreign language search server (search device) 10 provided on a communication network such as the Internet, and at least one communication terminal 20 in which an application program (server utilization app) for utilizing the foreign language search server 10 has been installed.

The communication terminal 20 has a function of communicating with the foreign language search server 10 and may be implemented in various forms including an electronic device such as a smartphone, a tablet terminal, an electronic dictionary, a personal computer (PC), a cellular phone, an electronic book, a portable game device, 1.0 and so on.

<Functions of Foreign Language Search Server 10>

The foreign language search server 10 has at least functions (a) and (b), which are:

(a) a function of storing and managing user information (including identification (ID) information) of the communication terminal in which the server utilization app has been installed; and (b) a function of searching a dictionary database (DB) for an entry word that corresponds to a search character (a search character string) input via the foreign language search screen G displayed on a display part 21 of the communication terminal 20, and causing the communication terminal 20 to display the search result, which may include the entry word and its explanatory information such as a translation, a meaning, a sample sentence, and a glossary.

<Electronic Circuitry of Foreign Language Search Server 10 and Communication Terminal 20>

Figure 2:
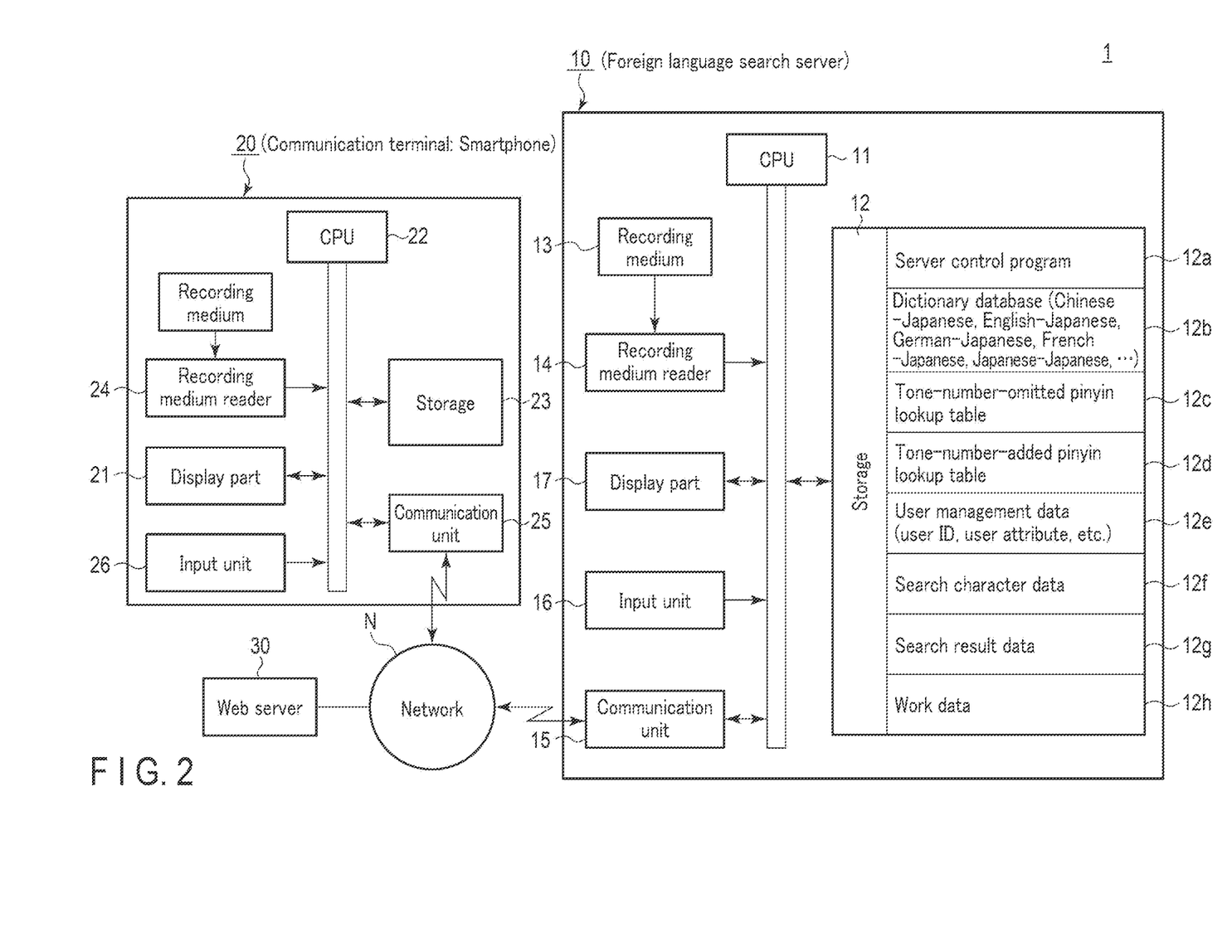
FIG. 2 is a block diagram showing an exemplary functional configuration of each of a foreign language search server 10 and a communication terminal 20.

FIG. 2 is a block diagram showing an exemplary functional configuration of each of the foreign language search server 10 and the communication terminal 20.

The foreign language search server 10 includes a controller 11 which may be a computer or a central processing unit (CPU), a storage 12, a recording medium reader 14, a communication unit 15, an input unit 16, and a display part 17.

The controller 11 is constituted by one or more processors and controls operations of each circuitry component in response to an input signal sent from the input unit 16 according to a user operation and/or a signal received via the communication unit 15 from the communication terminal 20 present on the communication network N, in line with one or more programs including a server control program 12a stored in the storage 12.

The server control program 12a may be stored in advance in the storage 12, or may be read from an external recording medium 13 such as a CD-ROM via the recording medium reader 14 and stored in the storage 12.

The server control program 12a at least includes a program or programs for implementing the functions (a) and (b) described above.

The storage 12 secures, in addition to a storage region for the server control program 12a, various storage regions including a dictionary database storage region 12b, a tone-number-omitted pinyin lookup table storage region 12c, a tone-number-added pinyin lookup table storage region 12d, a user management data storage region 12e, a search character data storage region 12f, a search result data storage region 12g, and a work data storage region 12h.

The dictionary database storage region 12b stores a variety of dictionary datasets in which each entry word is associated with its explanatory information, such as a translation, a meaning, a sample sentence, and a glossary for each index data number. The dictionary datasets include data for a Chinese-Japanese dictionary for mutual conversion between a word or a usage of the Chinese language, i.e., a tonal language, and that of the Japanese language. The dictionary datasets may also include data for an English-Japanese dictionary, a German-Japanese dictionary, a French-Japanese dictionary, and a Japanese-Japanese dictionary.

Figure 3:
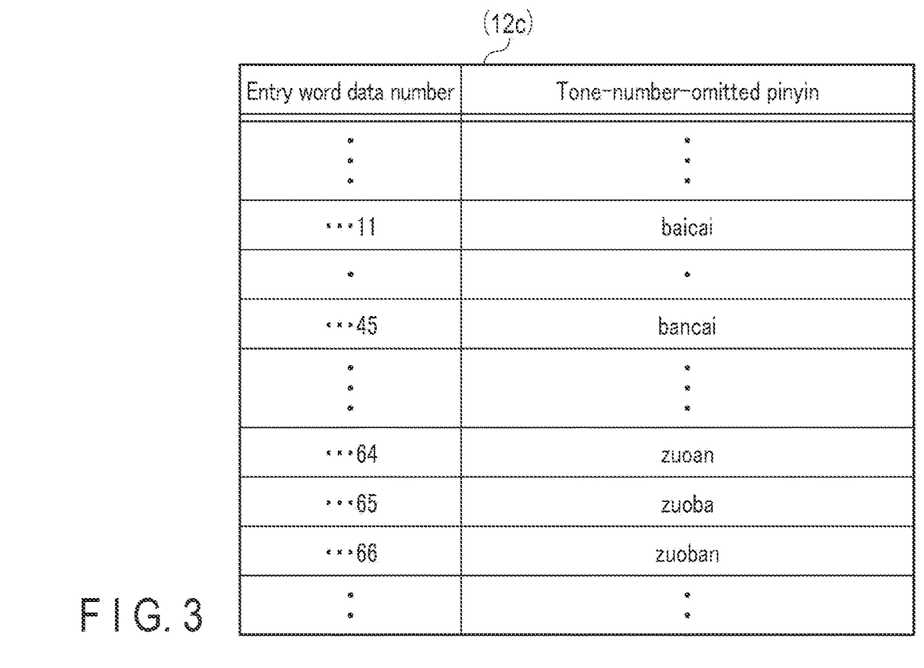
FIG. 3 is a diagram showing contents of an exemplary tone-number-omitted pinyin lookup table stored in a tone-number-omitted pinyin lookup table storage region 12c of the foreign language search server 10.

FIG. 3 is a diagram showing contents of an exemplary tone-number-omitted pinyin lookup table stored in the tone-number-omitted pinyin lookup table storage region 12c of the foreign language search server 10.

The tone-number-omitted pinyin lookup table (12c) lists, in association with the respective data numbers of the entry words in the Chinese-Japanese dictionary stored in the dictionary database storage region 12b, character strings of the entry words each in the form of tone-number-omitted pinyin. Here, tone-number-omitted pinyin refers to a phonetic representation obtained by removing tone mark indications (e.g., tone numbers "1" to "4") from a tone-indicated alphabetical character string converted from a Chinese entry word.

Figure 4:
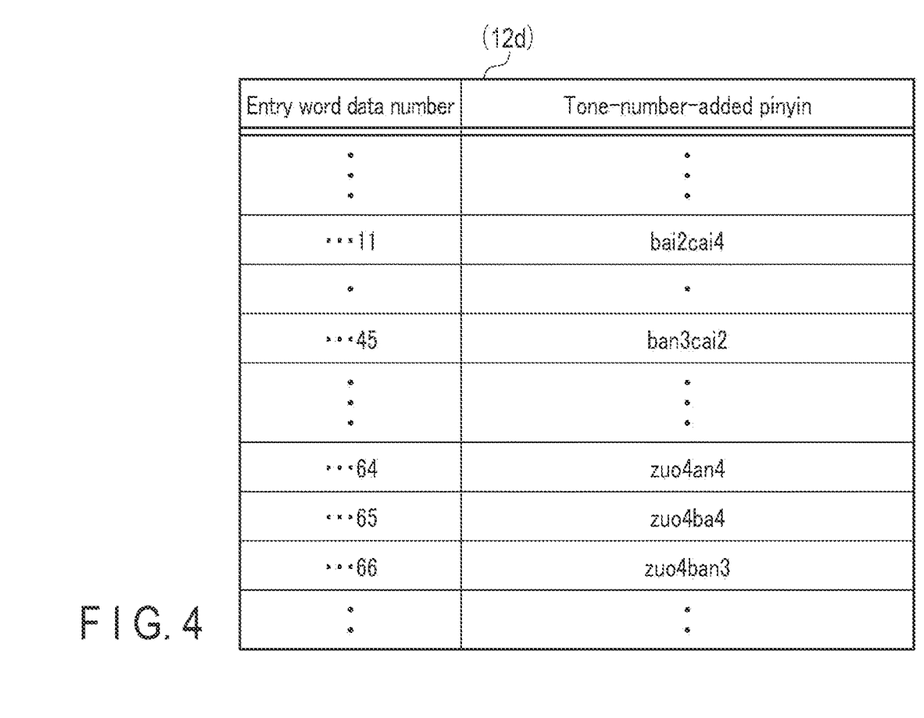
FIG. 4 is a diagram showing contents of an exemplary tone-number-added pinyin lookup table stored in a tone-number-added pinyin lookup table storage region 12d of the foreign language search server 10.

FIG. 4 is a diagram showing contents of an exemplary tone-number-added pinyin lookup table stored in the tone-number-added pinyin lookup table storage region 12d of the foreign language search server 10.

The tone-number-added pinyin lookup table (12d) lists, in association with the respective data numbers of the entry words in the Chinese-Japanese dictionary stored in the dictionary database storage region 12b, character strings of the entry words each in the form of tone-number-added pinyin. Here, tone-number-added pinyin refers to a phonetic representation constituted by a tone-indicated alphabetical character string converted from a Chinese entry word, and includes a tone mark indication (e.g., any one of tone numbers "1" to "4") at each syllable.

Note that, while the embodiment assumes that the foreign language search server 10 stores both of the two tables, i.e., the tone-number-omitted pinyin lookup table (12c) and the tone-number-added pinyin lookup table (12d), the foreign language search server 10 may omit, for example, storage of the tone-number-omitted pinyin lookup table (12c). In this case, a character string of a tone-number-omitted pinyin entry word may be read from the tone-number-added pinyin lookup table (12d) with tone numbers (1 to 4) excluded.

The user management data storage region 12e stores, for each of the users of respective communication terminals 20 in which the server utilization app has been installed, user attributes such as a school name and a grade in association with the user ID such as user identification information and an app ID.

The search character data storage region 12f stores search character data (search character string data) input by the communication terminal 20 in the course of using the foreign language search server 10.

The search result data storage region 12g stores search result data including, for example, information on a searched dictionary and the data number of a search target entry word, or a search target entry word and its explanatory information, retrieved from the dictionary database (12b) based on the search character data (search character string data) stored in the search character data storage region 12f.

The work data storage region 12h stores, as appropriate and on a temporary basis, various data sets generated or acquired according to the control of the controller 11 for each component.

The foreign language search server 10 having the foregoing configurations realizes various functions as will be described in more detail, through cooperative software and hardware actions in which the controller 11 controls operations of each circuitry component according to the instructions described in the server control program 12a.

Similar to the foreign language search server 10, the communication terminal 20 includes a controller 22 (e.g., CPU), a storage 23, a recording medium reader 24, a communication unit 25, an input unit 26, and a display part 21 (which may be a touch-panel type) in its electronic circuitry. The storage 23 stores a server utilization app as mentioned above. Note that this server utilization app may be received from the foreign language search server 10 upon establishment of a connection between the foreign language search server 10 and the communication terminal 20 and run as a Web browser-executable program.

(Operations in Embodiments)

Next, operations of the search system 1 according to the embodiment will be described.

Figure 5:
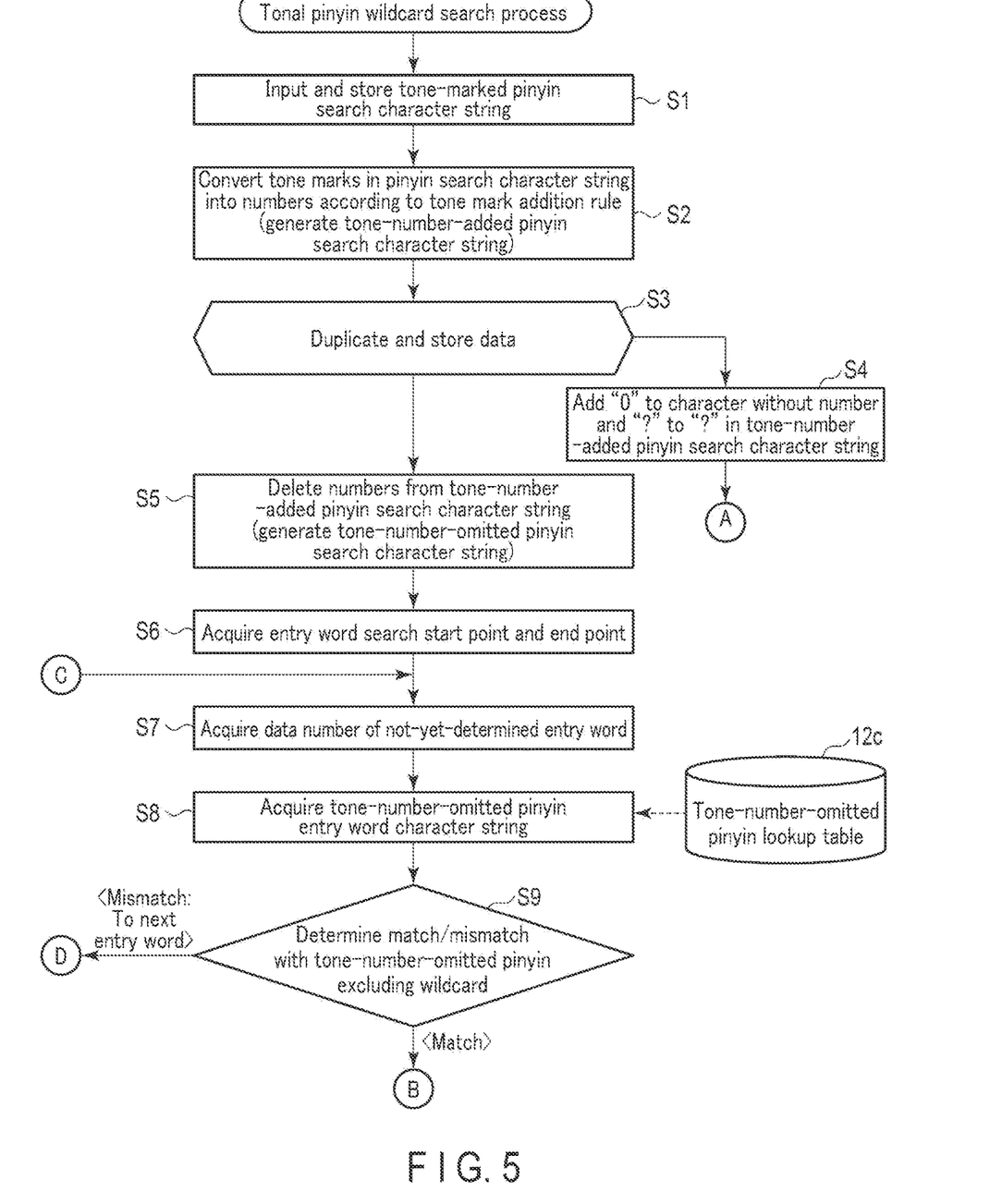
FIG. 5 is a flowchart for illustrating an exemplary tonal pinyin wildcard search process conducted with a Chinese-Japanese dictionary in the foreign language search server 10.
Figure 6:
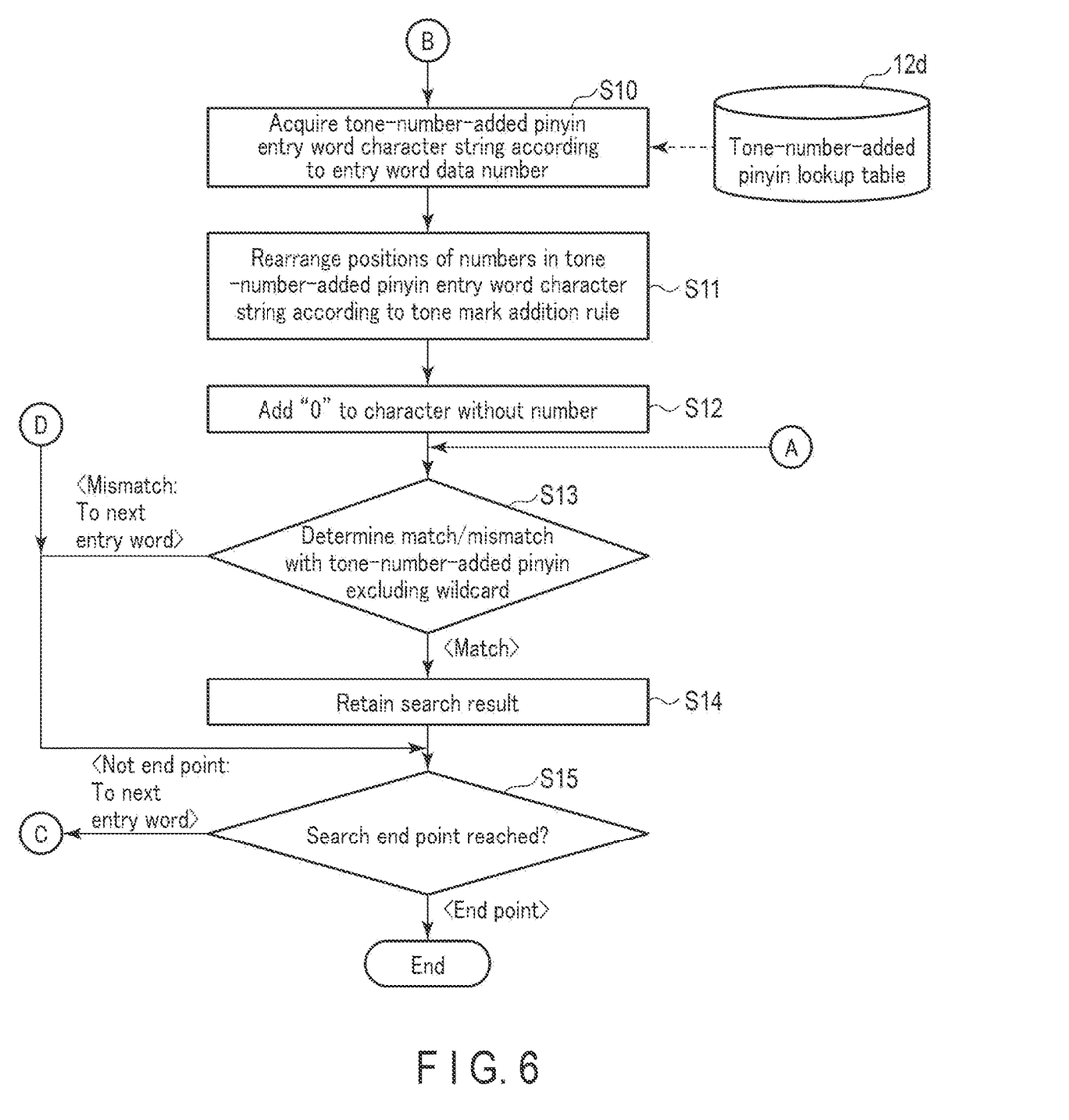
FIG. 6 is a flowchart for illustrating the exemplary tonal pinyin wildcard search process conducted with the Chinese-Japanese dictionary in the foreign language search server 10.

FIGS. 5 and 6 present a flowchart for illustrating an exemplary tonal pinyin wildcard search process conducted with a Chinese-Japanese dictionary in the foreign language search server 10.

Figure 7:
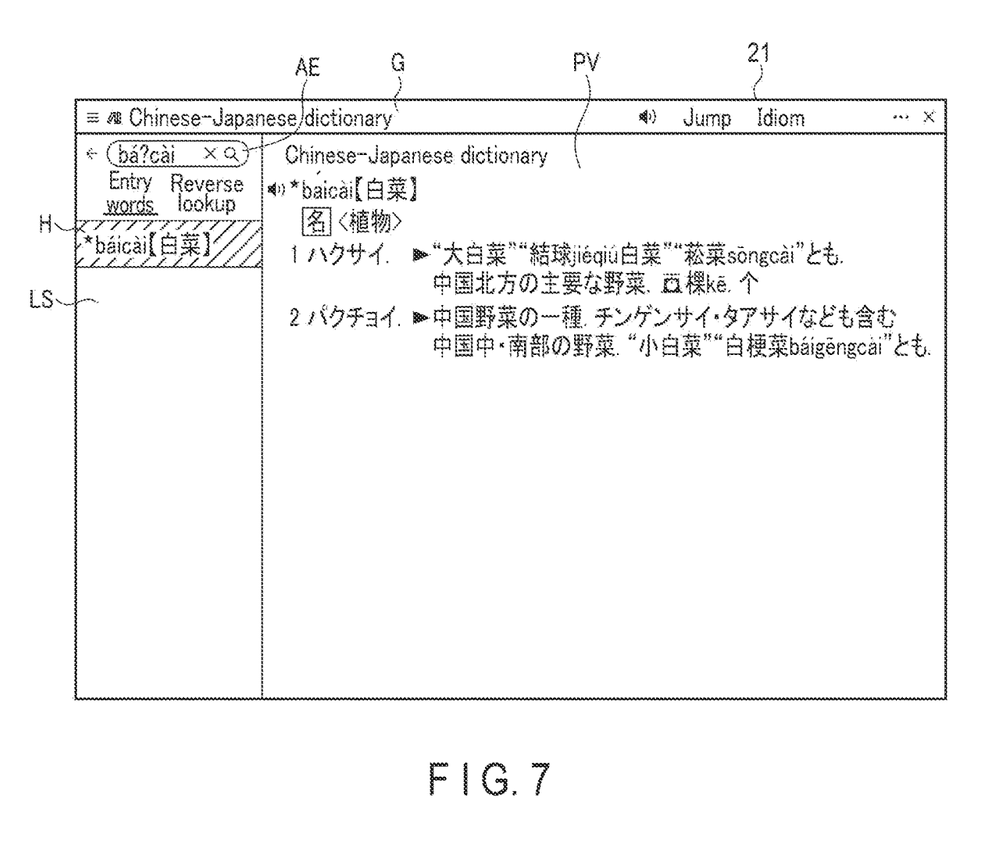
FIG. 7 is a diagram showing an exemplary foreign language search screen G for a Chinese-Japanese dictionary, displayed on the communication terminal 20 according to the tonal pinyin wildcard search process conducted with the foreign language search server 10.

FIG. 7 is a diagram showing an exemplary foreign language search screen G for a Chinese-Japanese dictionary, displayed on the communication terminal 20 according to the tonal pinyin wildcard search process conducted with the foreign language search server 10.

For example, suppose a state in which the communication terminal 20 and the foreign language search server 10 are communicably connected to each other. In this state, upon receiving designation of a Chinese-Japanese dictionary as a user's desired dictionary and an input of a search character string corresponding to a search-desired entry word according to the server utilization app installed in the communication terminal 20, the foreign language search server 10 causes the (touch-panel type) display part 21 of the communication terminal 20 to display the foreign language search screen G for the Chinese-Japanese dictionary as shown in FIG. 7.

Note that the foreign language search screen G shown in FIG. 7 represents a phase where the search character string has been input to a search character input area AE and an outcome of the search including the entry word and its explanatory information is presented in a preview area PV. It may be assumed that, in a starting phase where the input of a search character string to the search character input area AE is incomplete, entry words that each have a head portion conforming to the incompletely input search character string are displayed in a list LS, and the preview area PV shows an entry word selected from the list LS with a highlight H together with the corresponding explanatory information.

The user here performs a wildcard search in order to search for a Chinese entry word containing an unknown phonetic part. The wildcard search is performed by inputting, to the search character input area AE, a tone-marked pinyin search character string in which tone marks are added to the alphabetical letters for phonetic representation and a character at an unknown phonetic part is replaced with a wildcard "?".

An input of such a tone-marked pinyin search character string in which tone marks are added to the alphabetical letters for phonetic representation is enabled by, for example, the foreign language search server 10 causing the communication terminal 20 to display a software keyboard including alphabetical keys and tone mark keys.

It will be assumed that a tone-marked pinyin search character string "ba?cai" containing the wildcard "?" is input to the search character input area AE. (Note that the input character string here actually has a tone mark representing the second tone above the second character "a" and a tone mark representing the fourth tone above the fifth character "a".)

In response to an input of the tone-marked pinyin search character string to the search character input area AE, the controller 11 of the foreign language search server 10 stores the input tone-marked pinyin search character string, i.e., "ba?cai" (with tone marks), in the search character data storage region 12f (step S1).

The controller 11 converts the tone marks in the tone-marked pinyin search character string "ba?cai" (with tone marks) stored in the search character data storage region 12f into tone numbers. More specifically, the controller 11 converts the tone marks into tone numbers in such a manner that the second-tone representing mark is converted into "2" and the fourth-tone representing mark is converted into "4" as a conversion into an XML-type description language and according to a tone mark addition rule (which is a rule for the locations of tone marks and stipulates additions to tone-mark-associated vowels). The controller 11 thus generates a tone-number-added pinyin search character string "ba2?ca4i" (a first search target character string) (step S2).

The controller 11 generates a duplicate of the tone-number-added pinyin search character string "ba2?ca4i" (the first search target character string) and stores the duplicate in the work data storage region 12h (step S3).

The controller 11 generates a tone-number-added pinyin search character string "b0a2??c0a4i0" (a second search target character string) for wildcard search, using the tone-number-added pinyin search character string "ba2?ca4i" (the first search target character string) that underwent the XML conversion in step S2 and was stored in the search character data storage region 12f. More specifically, the controller 11 generates the string "b0a2??c0a4i0" by modifying the string "ba2?ca4i" in such a manner that "0" is added to a position immediately after the character having no number (i.e., an alphabetical letter representing a consonant) and a tone number wildcard "?" is added to a position immediately after the existing wildcard "?" (step S4). Note that while the embodiment assumes a configuration in which the controller 11 inserts the tone number wildcard "?" in response to the user inputting a wildcard "?" for the character at an unknown phonetic part, it is also possible to adopt a configuration in which the wildcard "?" for the character at an unknown part and the tone number wildcard "?" are consecutively input by a discretionary user operation.

The "0" added to a position immediately after the character having no number (i.e., an alphabetical letter representing a consonant) indicates the absence of a tone mark (a tone number), as the associated character is a consonant. The tone number wildcard "?" added to a position immediately after the existing wildcard "?" indicates, since "?" repeats twice, that the associated character (alphabetical letter) is either a vowel or a consonant, and if it is a vowel, that its tone mark is unknown.

On the other hand, the controller 11 generates a tone-number-omitted pinyin search character string "ba?cai" using the duplicate of the tone-number-added pinyin search character string "ba2?ca4i" (the first search target character string), prepared and then stored in the work data storage region 12h in step S3, in such a manner as to delete the tone numbers (step S5).

The controller 11 acquires a search start point and a search end point for entry words in the Chinese-Japanese dictionary (for example, a search start point "1" and a search end point "the last number"), as respective data numbers (step S6).

The controller 11 acquires the data number of a not-yet-determined entry word as a search target (in this example, data number "1" is assumed) (step S7). The controller 11 then acquires, from the tone-number-omitted pinyin lookup table (12c) (cf. FIG. 3), a character string of a tone-numberomitted pinyin entry word corresponding to the data number acquired in step S7 for the not-yet-determined entry word (step S8).

The controller 11 compares the tone-number-omitted pinyin search character string "ba?cai" generated in step S5 and including the wildcard "?" with the tone-number-omitted pinyin entry word character string acquired in step S8 to determine whether or not these character strings match each other in the total number of characters and the characters except at the wildcard "?" (step S9).

If a mismatch is determined in step S9 (step S9, "Mismatch"), the controller 11 determines whether or not the data number corresponding to the tone-number-omitted pinyin entry word character string subjected to the determination in step S9 has reached the search end point "the last number" (step S15). If it is determined that the search end point "the last number" has not been reached (step S15, "Not end point"), the controller 11 repeats the set of acquisition of the data number of a next not-yet-determined entry word as a search target and comparison of the tone-number-omitted pinyin search character string "ba?cai" including the wildcard "?" with the tone-number-omitted pinyin entry word character string corresponding to the acquired data number (steps S7 to S9).

Here, if a match is determined between the tone-number-omitted pinyin search character string "ba?cai" and, for example, a tone-number-omitted pinyin entry word character string "baicai" having the data number "11" as illustrated in FIG. 3 (step S9, "Match"), the controller 11 acquires, from the tone-number-added pinyin lookup table (12d) (cf. FIG. 4), a tone-number-added pinyin entry word character string "bai2cai4" corresponding to the data number "11" of the tone-number-omitted pinyin entry word character string "baicai" (a conversion candidate) for which a match has been determined (step S10).

The controller 11 rearranges the positions of the numbers ("2" and "4" in this example) included in the tone-number-added pinyin entry word character string "bai2cai4" acquired in step S10, according to the tone mark addition rule (which stipulates additions to tone-mark-associated vowels), so that a tone-number-added pinyin entry word character string "ba2ica4i" is generated (step S11).

The controller 11 generates a tone-number-added pinyin entry word character string "b0a2i0c0a4i0" (a conversion candidate character string) for wildcard search, by adding "0" to each character having no number (i.e., an alphabetical letter representing a consonant) in the tone-number-added pinyin entry word character string "ba2ica4i" generated in step S11 (step S12).

The controller 11 compares the tone-number-added pinyin search character string "b0a2??c0a4i0" (the second search target character string) for wildcard search, generated in step S4, with the tone-number-added pinyin entry word character string "b0a2i0c0a4i0" (the conversion candidate character string) for wildcard search, generated in step S12, to determine whether or not these character strings match each other in the total number of characters and the characters except at the wildcard "?" (step S13).

Here, if a match is determined between the tone-number-added pinyin search character string "b0a2??c0a4i0" (the second search target character string) for wildcard search and the tone-number-added pinyin entry word character string "b0a2i0c0a4i0" (the conversion candidate character string) for wildcard search (step S13, "Match"), the controller 11 stores, as a search result (a comparison result), the data number corresponding to the pinyin entry word character string "b0a2i0c0a4i0" for which a match has been determined (the data number "11" corresponding to the tone-number-added pinyin entry word character string "bai2cai4" acquired in step S10) in the search result data storage region 12g (step S14).

Note that the controller 11 may also read data on the entry word corresponding to the data number from the dictionary database (12b) and store the data in the search result data storage region 12g as a part of the search result (the comparison result).

The controller 11 determines whether or not the data number stored as the search result in step S14 has reached the search end point "the last number" (step S15). If it is determined that the search end point "the last number" has not been reached (step S15, "Not end point"), the controller 11 repeats the processing steps from step S7 by acquiring the data number of a next not-yet-determined entry word as a search target.

Then, upon acquisition of the data number (e.g., "45" as illustrated in FIG. 3) of the next not-yet-determined entry word and if a match is determined between the tone-number-omitted pinyin search character string "ba?cai" and the tone-number-omitted pinyin entry word character string "bancai" having the data number "45" (step S9, "Match"), the controller 11 acquires, from the tone-number-added pinyin lookup table (12d) (cf. FIG. 4), a tone-number-added pinyin entry word character string "ban3cai2" corresponding to the data number "45" of the tone-number-omitted pinyin entry word character string "bancai" (a conversion candidate) for which a match has been determined (step S10).

The controller 11, in the same manner as discussed above, rearranges the positions of the numbers ("3" and "2" in this example) included in the tone-number-added pinyin entry word character string "ban3cai2" acquired in step S10, according to the tone mark addition rule (which stipulates additions to tone-mark-associated vowels), so that a tone-number-added pinyin entry word character string "ba3nca2i" is generated (step S11).

The controller 11 then generates a tone-number-added pinyin entry word character string "b0a3n0c0a2i0" (a conversion candidate character string) for wildcard search, by adding "0" to each character having no number (i.e., an alphabetical letter) in the tone-number-added pinyin entry word character string "ba3nca2i" generated in step S11 (step S12).

The controller 11 compares the tone-number-added pinyin search character string "b0a2??c0a4i0" (the second search target character string) for wildcard search, generated in step S4, with the tone-number-added pinyin entry word character string "b0a3n0c0a2i0" (the conversion candidate character string) for wildcard search, generated in step S12, to determine whether or not these character strings match each other in the total number of characters and the characters except at the wildcard "?" (step S13).

If a mismatch is determined between the tone-number-added pinyin search character string "b0a2??c0a4i0" for wildcard search and the tone-number-added pinyin entry word character string "b0a3n0c0a2i0" for wildcard search (step S13, "Mismatch"), the controller 11 determines whether or not the data number "45" of the tone-number-added pinyin entry word character string "ban3cai2" corresponding to the tone-number-added pinyin entry word character string "b0a3n0c0a2i0" (the conversion candidate character string) for wildcard search, subjected to the determination in step S13, has reached the search end point "the last number" (step S15). If it is determined that the search end point "the last number" has not been reached (step S15, "Not end point"), the controller 11 repeats again the processing steps from step S7 by acquiring the data number of a next not-yet-determined entry word as a search target.

Thereafter, upon determining in step S15 either that the data number corresponding to the tone-number-omitted pinyin entry word character string subjected to the determination in step S9 has reached the search end point "the last number" or that the data number corresponding to the tone-number-added pinyin entry word character string subjected to the determination in step S13 has reached the search end point "the last number" (step S15, "End point"), the controller 11 terminates the series of processing steps of the tonal pinyin wildcard search process.

The controller 11 reads, from the Chinese-Japanese dictionary data (12b), an entry word "baicai [白菜]" which corresponds to the data number in the search result (the comparison result) stored in the search result data storage region 12g. Here, if multiple data numbers are stored as the search result, corresponding respective entry words are read. The controller 11 then causes the display part 21 of the communication terminal 20 to display the read entry word or words in the list LS in the currently displayed foreign language search screen G as shown in FIG. 7. The controller 11 controls the display part 21 so that the preview area PV shows the entry word "baicai [白菜]" selected and displayed with a highlight H in the list LS, together with the corresponding explanatory information.

In response to a designation of the preview area PV in the foreign language search screen G by, for example, a touch of the user, the controller 11 deploys the entry word and the explanatory information displayed in the preview area PV, across the entire display part 21 for presentation as an entry word explanatory screen (not illustrated).

As described above, even in instances of dealing with a Chinese word or phrase containing an unknown phonetic part, a tonal pinyin-utilized wildcard search process is performed upon inputting, to the search character input area AE, a tone-marked pinyin search character string in which tone marks are added to the alphabetical letters for phonetic representation and a character at an unknown phonetic part is replaced with a wildcard "?". This realizes accurate retrieval of desired words and phrases.

(Summary of Embodiments)

In the search system 1 according to an embodiment, the foreign language search server 10, in response to the communication terminal 20 inputting a tone-marked pinyin search character string in which an unknown phonetic part is replaced with a wildcard "?", performs an XML conversion on the input tone-marked pinyin search character string to generate a tone-number-added pinyin search character string (a first search target character string) in which a tone number or numbers are added according to the tone mark addition rule.

The foreign language search server 10 acquires, from the tone-number-omitted pinyin lookup table 12c for entry words in a Chinese-Japanese dictionary, a tone-number-omitted pinyin entry word character string (a conversion candidate) which conforms to, excluding the portion at the wildcard "?", a tone-number-omitted pinyin search character string obtained by removing the tone numbers from the tone-number-added pinyin search character string (the first search target character string). The foreign language search server 10 also acquires, from the tone-number-added pinyin lookup table 12d for entry words in the same Chinese-Japanese dictionary, a tone-number-added pinyin entry word character string of the corresponding entry word. The foreign language search server 10 then generates a tone-number-added pinyin entry word character string (a conversion candidate character string) for wildcard search, by rearranging the positions of the tone numbers included in the acquired tone-number-added pinyin entry word character string according to the tone mark addition rule, and by further adding "0" to each character having no tone number in the acquired tone-number-added pinyin entry word character string.

The foreign language search server 10 generates a tone-number-added pinyin search character string (a second search target character string) for wildcard search, by adding "0" to each character having no tone number and a tone number wildcard "?" to a position immediately after the existing wildcard "?" in the tone-number-added pinyin search character string (the first search target character string). The foreign language search server 10 then compares the tone-number-added pinyin search character string (the second search target character string) for wildcard search with the tone-number-added pinyin entry word character string (the conversion candidate character string) for wildcard search to determine whether or not these character strings match each other. If a match is determined, the foreign language search server 10 stores an entry word from the Chinese-Japanese dictionary, corresponding to this tone-number-added pinyin entry word character string (the conversion candidate character string) for wildcard search, and outputs it to the communication terminal 20 for display.

In this manner, the tone-number-added pinyin search character string (the second search target character string) for wildcard search is generated from the tone-number-added pinyin search character string (the first search target character string) corresponding to an input tone-marked pinyin search character string with a wildcard "?", by adding "0" to each character having no tone number and a tone number wildcard "?" to the existing wildcard "?" in the tone-number-added pinyin search character string (the first search target character string). Also, the tone-number-added pinyin entry word character string (the conversion candidate character string) for wildcard search is generated by adding "0" to each character having no tone number in the tone-number-added pinyin entry word character string corresponding to an entry word in the Chinese-Japanese dictionary for which a match with the tone-number-omitted pinyin search character string has been determined. The generated tone-number-added pinyin search character string (the second search target character string) for wildcard search and the generated tone-number-added pinyin entry word character string (the conversion candidate character string) for wildcard search are compared to each other to determine if they match each other. Therefore, the wildcard search for Chinese language is enabled upon input of a tone-marked pinyin search character string in which an unknown phonetic part is replaced with a wildcard "?".

Accordingly, the embodiments can realize an accurate search of Chinese words and the like, i.e., expressions of a tonal language, in which a part of the phonetic representation and its tone are unknown.

Note that while the description of the embodiments has assumed instances of performing a wildcard search for a Chinese word, i.e., a tonal language, the embodiments are likewise applicable to other foreign languages such as Vietnamese, Thai, and Croatian, which fall under the tonal language category.

Moreover, while the description of the embodiments has assumed a configuration in which the search system 1 is constituted by the foreign language search server (search device) 10 and the communication terminal 20 having a function of communicating with this foreign language search server 10, the embodiments are not limited to such a configuration. For example, data sets and functions possessed by the foreign language search server (search device) 10 may be incorporated into the communication terminal 20 or other electronic devices, e.g., a smartphone, a tablet terminal, an electronic dictionary, a personal computer (PC), a cellular phone, an electronic book, and a portable game device so that such electronic devices can each serve as a search device independently realizing the foreign language search functions including the tonal pinyin wildcard search process described above.

Processes intended for implementation by the foreign language search server (search device) 10 of the search system 1 as described for the foregoing embodiments, namely, processing steps in the tonal pinyin wildcard search process illustrated in the flowcharts in FIGS. 5 and 6, and so on, may each or in combination be stored and distributed in the form of a computer-executable program in an external storage medium such as a memory card (a ROM card, a RAM card, etc.), a magnetic disk (a Floppy™ disk, a hard disk, etc.), an optical disk (a CD-ROM, a DVD, etc.), or a semiconductor memory. A controller (a CPU) in an electronic device may load this program stored in the external storage medium into its own storage unit and control the device operations according to the program, so that the various functions as discussed for each embodiment will be realized and the corresponding processes are performed.

The program data for realizing each process may also be transmitted on the communication network N in the form of program codes. The program data may be provided from a computer device (program server) connected to the communication network N and incorporated into the storage unit of an individual electronic device, so that the various functions discussed above are realized and the corresponding processes are performed.

The disclosure herein is not limited to the foregoing embodiments. For practical implementation, various modifications may be adopted without departing from its gist. The various embodiments may be discretionarily combined for implementation, and such combinations will produce combined effects. Moreover, the embodiments involve various aspects, and appropriate combinations of the disclosed features will permit various teachings to be derived. For example, if omission of several features from the entire configuration or structure disclosed for the embodiments can realize the intended object and provide the effects, the configuration or structure after such omission may be derived as the disclosed teachings.

What is claimed is:

1. A search device comprising:
  a processor configured to:
  cause a display of an external terminal to display a search character input area;
  receive, from the external terminal via a communication network, input of a character string entered into the search character input area, the input character string being constituted by a plurality of characters and a tone indication, the plurality of characters including an unknown character;
  acquire a first search target character string based on the input character string received from the external terminal;
  acquire, as a conversion candidate, a character string which matches the first search target character string without the tone indication;
  generate a conversion candidate character string of a predetermined number of characters by adding a tone indication to the conversion candidate;
  generate a second search target character string by at least adding a character indicative of an unknown tone indication to a position immediately after the unknown character among the plurality of characters in the first search target character string;
  compare the second search target character string with the conversion candidate character string; and
  cause the display of the external terminal to display a comparison result of comparing the second search target character string with the conversion candidate character string.

2. The search device according to claim 1, wherein the processor is configured to generate the second search target character string by further adding a character indicative of an absence of a tone indication to a character different from the unknown character among the plurality of characters in the first search target character string.

3. The search device according to claim 1, wherein the processor is further configured to rearrange a position of the tone indication included in the conversion candidate character string according to a rule for locations of tone indications.

4. The search device according to claim 1, wherein the processor is configured to acquire the first search target character string by converting the character string, which is input into the search character input area, into an XML-type description language according to a rule for locations of tone indications.

5. The search device according to claim 1, wherein the processor is configured to generate the conversion candidate character string by further adding a character indicative of an absence of a tone indication to a character to which no tone indication is added among characters in the conversion candidate, for comparison between the conversion candidate character string and the second search target character string.

6. The search device according to claim 1, wherein the processor is configured to acquire the conversion candidate by reading the character string which matches the first search target character string without the tone indication, from a character string table for predetermined phonetic representations corresponding to entry words in a dictionary.

7. The search device according to claim 1, wherein the processor is configured to generate the conversion candidate character string based on a character string table for tone-indication-added predetermined phonetic representations corresponding to entry words in a dictionary.

8. A search method performed by a search device, the search method comprising:
  causing a display of an external terminal to display a search character input area;
  receiving, from the external terminal via a communication network, input of a character string entered into the search character input area, the input character string being constituted by a plurality of characters and a tone indication, the plurality of characters including an unknown character;
  acquiring a first search target character string based on the input character string received from the external terminal;
  acquiring, as a conversion candidate, a character string which matches the first search target character string without the tone indication;

generating a conversion candidate character string of a predetermined number of characters by adding a tone indication to the conversion candidate;
generating a second search target character string by at least adding a character indicative of an unknown tone indication to a position immediately after the unknown character among the plurality of characters in the first search target character string;
comparing the second search target character string with the conversion candidate character string; and
causing the display of the external terminal to display a comparison result of comparing the second search target character string with the conversion candidate character string.

9. A non-transitory computer-readable storage medium having stored thereon a program that is executable by a computer to cause the computer to:
cause a display of an external terminal to display a search character input area;
receive, from the external terminal via a communication network, input of a character string entered into the search character input area, the input character string being constituted by a plurality of characters and a tone indication, the plurality of characters including an unknown character;
acquire a first search target character string based on the input character string received from the external terminal;
acquire, as a conversion candidate, a character string which matches the first search target character string without the tone indication;
generate a conversion candidate character string of a predetermined number of characters by adding a tone indication to the conversion candidate;
generate a second search target character string by at least adding a character indicative of an unknown tone indication to a position immediately after the unknown character among the plurality of characters in the first search target character string;
compare the second search target character string with the conversion candidate character string; and
cause the display of the external terminal to display a comparison result of comparing the second search target character string with the conversion candidate character string.

10. A computer-implemented tonal language search system comprising:
a memory which is configured to store a dictionary of a tonal language, a first look-up table and a second look-up table, wherein the first look-up table lists character strings of entry words of the dictionary as tone-number-omitted phonetic character strings, and wherein the second look-up table lists character strings of corresponding entry words of the dictionary as tone-number-added phonetic character strings in which tone numbers are included at each syllable, wherein the phonetic character strings of the first and second look-up tables are phonetic representations of the corresponding entry words of the dictionary and utilize an alphabet other than a native alphabet of the tonal language; and
a processor configured to:
cause a display of an external terminal to display a search character input area;
receive, from the external terminal via a communication network, input of a tone-marked search character string entered into the search character input area, the tone-marked search character string being constituted by a plurality of phonetic characters and one or more tone indications associated with one or more of the phonetic characters, wherein at least one of the phonetic characters is unknown and is represented by a predetermined wildcard character in the input tone-marked search character string, wherein the phonetic characters of the input tone-marked search character string utilize the same alphabet as the phonetic character strings of the first and second look-up tables;
convert the one or more tone indications of the input tone-marked search character string into tone numbers as a conversion into an XML-type description language according to a tone mark addition rule, which is a rule for positions of tone numbers and stipulates additions to tone-mark-associated vowels, to thereby generate a first search target character string in which tone numbers are added at positions defined by the tone mark addition rule;
generate a tone-number-omitted search character string by deleting the tone numbers included in the first search target character string, using a duplicate of the first search target character string;
iteratively search a defined search window of the first look-up table to identify a tone-number-omitted phonetic character string that matches the tone-number-omitted search character string except at the unknown character represented by the wildcard character;
acquire, as a conversion candidate, a tone-number-added character string from the second look-up table which corresponds to the identified tone-number-omitted phonetic character from the first look-up table that matches the tone-number-omitted search character string;
generate a conversion candidate character string of a predetermined number of characters by rearranging positions of the one or more tone numbers of the conversion candidate according to the tone mark addition rule, and by adding, to the conversion candidate, a placeholder character indicative of an absence of a tone indication to a character to which no tone number is added in the conversion candidate;
generate a second search target character string by adding an additional wildcard character indicative of an unknown tone indication to a position immediately after the wildcard character representing the unknown character among the plurality of characters in the first search target character string, and by adding the placeholder character indicative of an absence of a tone indication to a character to which no tone number is added in the first search target character string;
compare the second search target character string with the conversion candidate character string by executing a match evaluation that disregards the wildcard characters to determine whether the second search target character string matches the conversion candidate character string in total number of characters and matches in characters except at the wildcard characters; and
in response to a determination that the second search target character string matches the conversion candidate character string, cause the display of the external terminal to display an entry word from the dictionary stored in the memory corresponding to the conversion candidate character string.

* * * * *